April 6, 1965  J. R. MIRET  3,176,320
TRANSFORMABLE MULTIPLE UTILITY COT
Filed Jan. 24, 1962  2 Sheets-Sheet 1

INVENTOR.
JAIME RAMONET MIRET
BY
ATTORNEYS

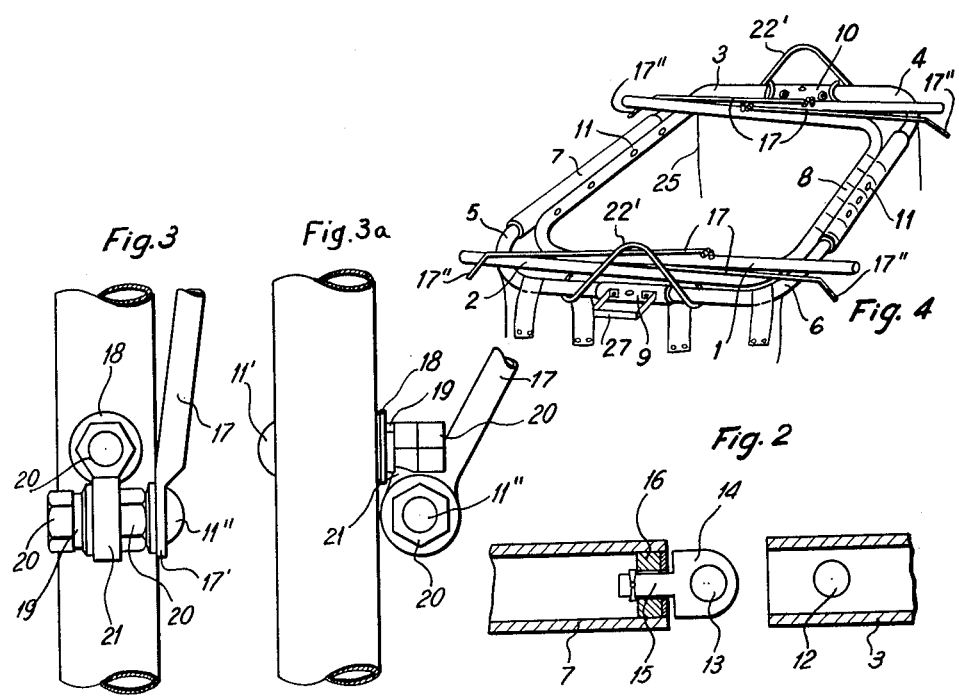

3,176,320
TRANSFORMABLE MULTIPLE UTILITY COT
Jaime Ramonet Miret, Calle Mont-Ros 6,
Barcelona, Spain
Filed Jan. 24, 1962, Ser. No. 168,476
2 Claims. (Cl. 5—3)

The present invention is concerned with a foldable and transformable piece of furniture of multiple functions, the particular construction of its components together with the folding of same and the addition of certain complementary pieces renders it capable of being carried, being suspended or converted into a table or a cradle.

The object of the present invention is to provide a piece of furniture that can be folded for storage and can be transformed into various types of furniture as desired.

Further objects of the invention will be in part obvious and in part pointed out in the following detailed description of the accompanying drawings, in which:

FIGURE 2 is an enlarged cross-sectional detail view of a rotary connection forming part of the device.

FIGURE 3 is an enlarged side view of a brace and leg connection.

FIGURE 3a is similar to FIGURE 3, but taken at right angles thereto.

FIGURE 4 is a perspective view of the device when folded.

Figure 1:
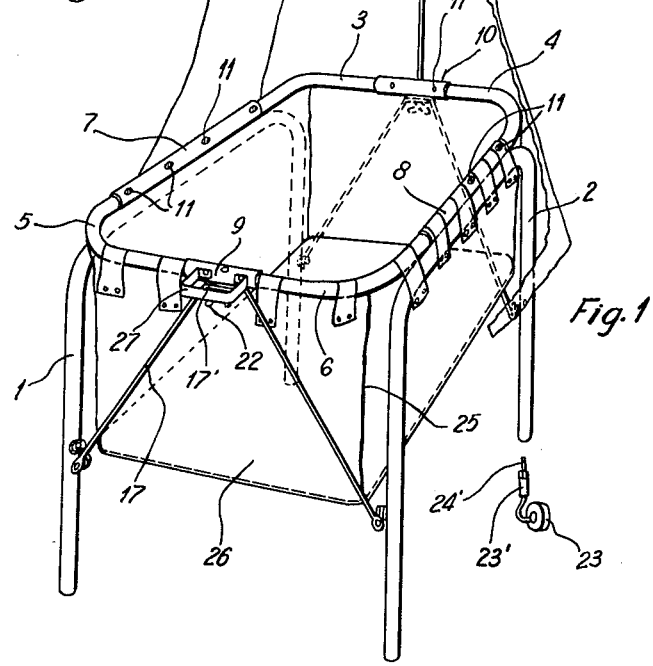
FIGURE 1 is a perspective view of the present device when used as a crib.

FIGURE 1 shows one realization of the invention comprising a main frame work of suitable material and dimensions, in which two similarly formed inverted U members 1 and 2 may be fitted with and sustained at the upper portions thereof by a frame consisting of four tubular curved members 3, 4, 5 and 6 and four straight tubular elements 7, 8, 9 and 10 into which the curved members are telescopically inserted and rigidly fixed by means of screws 11, said screws at the same time serving to rigidly fix said frame to the upper portions of the U members 1 and 2.

The aforementioned curved members 3, 4, 5 and 6, FIGURE 2, are provided with holes 12 through which said screws 11 may pass and at the same time through the perforations 13 in the lugs 14 which can rotate on their cylindrical portions 15 within the plug bearing elements 16 which are solidly fixed to the extremities of the aforementioned straight tubular elements 7 and 9.

Said U members 1 and 2 are interconnected and joined to the frame by means of rods 17 each of which are connected to the lower leg portions of the U members by means of a bolt 11″ extending through the flattened end 17′ of said rod and through ring 21, spring washer 19 and being in threaded engagement with a nut 20. Said ring 21 is integral with a second ring 18 extending normal to said first ring and mounted on the leg by a bolt 11′ extending through said leg, said ring 18, a spring washer 19 and being in threaded engagement with a nut 20 as shown in FIGURES 3 and 3a.

The other extremities 17″ of said rods are also flattened out in the same manner as the extremities 17′ thereof shown in FIGURE 3 and are joined to the upper frame by means of a screw 11 passing through the elements 9 and 10 and secured by a butterfly nut 22.

The extremities of the legs of the U elements 1 and 2 may be fitted with rotary castors having a wheel 23, rotary support 23′ and the threaded portion 24′ for screwing into similarly threaded portions of the extremities of the U elements.

A flexible sacklike container 25 is conveniently suspended, FIGURE 1, by straps 25a from which latter is provided with a handle 27 fixed thereto by means of screws 11, while the bottom of the container 25 is provided with a rigid base board 26 and the cot or cradle is completed with a detachable rod 28 for suspending a veil 29.

In order to fold up the cot or its tubular structure, the rods 17 are separated from the upper frame by unscrewing the butterfly nuts 22 whereupon it is possible to pivot said U elements upon the loosening of nuts 20 thus allowing the screws 11″, shown in FIGURE 3a to act as pivots for pivoting rods 17 which may be folded back on to the U elements as soon as there have been placed into the position indicated in FIGURE 4. As soon as the cot has been folded as indicated with the rigid base 26 of the container still in place, it may be suspended from existing supports in trains, automobiles or the like, with the help of the detachable elements 22′ which may also be used for carrying the folded cot by hand.

Figure 5:
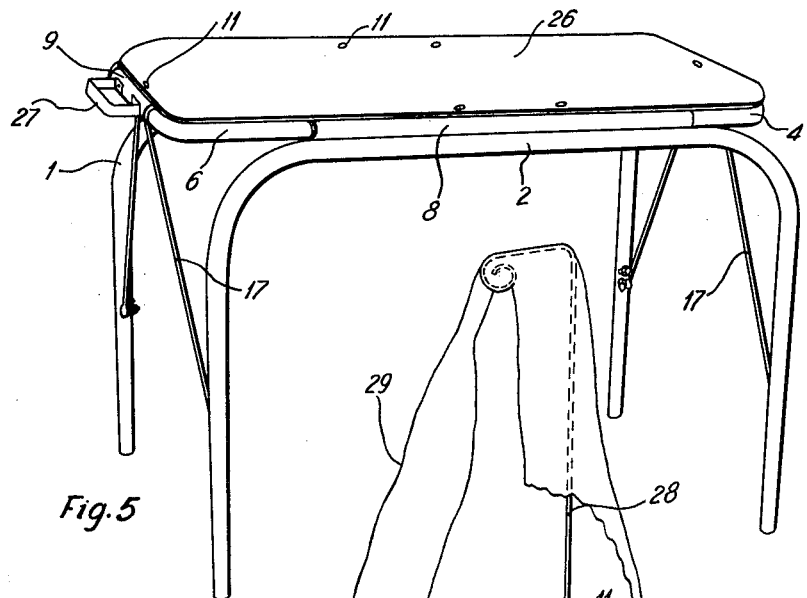
FIGURE 5 is a perspective view of the device when used as a table.

The transformation of the cot into a table is shown in FIGURE 5, and is performed by rasing said base board 26 onto the top of said frame to which it is fixed by means of screws 11 extending through openings 11a in said base board.

Having now particularly described and ascertained the nature of said invention and the manner in which it is to be performed, what I claim is:

1. A foldable and transformable piece of furniture comprising a pair of inverted similar U-shaped side members each having a base with legs extending therefrom, a pair of similar straight members each fixedly mounted on one of said bases, for symmetrically curved tubular members, means rotatably connecting the ends of each of said straight members to the ends of a pair of said curved members, a second pair of similar straight members fixedly connecting the other ends of said curved members forming a flat frame, V-shaped braces detachably connected to said second pair of straight members and pivotally connected to said side members normally holding said side members spaced apart and parallel to one another, a rigid base board of a configuration for being mounted on the top of said straight and curved members forming a table therewith and flexible means connected to said flat frame and said base board capable of suspending said base board below said straight and curved members alternately forming a cradle.

2. A foldable and transformable piece of furniture as claimed in claim 1 wherein said flexible means consists of an open top container having said base board attached to the bottom thereof and flexible straps attach said container open top to said straight and curved members suspending said container therefrom.

(References on following page)

References Cited by the Examiner

UNITED STATES PATENTS

| | | | |
|---|---|---|---|
| 833,987 | 10/06 | Truslow | 248—439 |
| 858,475 | 7/07 | Scanlan | 5—114 |
| 939,824 | 11/09 | Forbes et al. | 108—129 X |
| 1,102,140 | 6/14 | Collins | 5—362 |
| 2,556,261 | 6/51 | Dubach | 108—129 X |
| 2,587,255 | 2/52 | Vogel et al. | 5—99.1 |
| 2,618,496 | 11/52 | Johnson | 248—188.4 |
| 2,644,172 | 7/53 | Arvilla | 5—98 |
| 2,688,997 | 9/54 | Miller | 5—98 |
| 2,719,383 | 10/55 | Emmert | 248—188.4 |
| 2,858,551 | 11/58 | Sidlinger | 5—114 |
| 2,873,458 | 2/59 | Adamson | 5—98 |
| 2,936,078 | 5/60 | Ziegler | 108—59 |
| 2,973,525 | 3/61 | Holtzclaw | 5—111 |

FOREIGN PATENTS

| | | |
|---|---|---|
| 15,157 | 1903 | Great Britain. |
| 562,603 | 7/44 | Great Britain. |
| 931,167 | 9/47 | France. |
| 95,276 | 12/59 | Norway. |

FRANK B. SHERRY, *Primary Examiner.*